Jan. 9, 1951 C. A. SHREEVE, JR., ET AL 2,537,096
HIGH ACCELERATION SHOCK TESTING AIR GUN
Filed Feb. 4, 1949 3 Sheets-Sheet 1
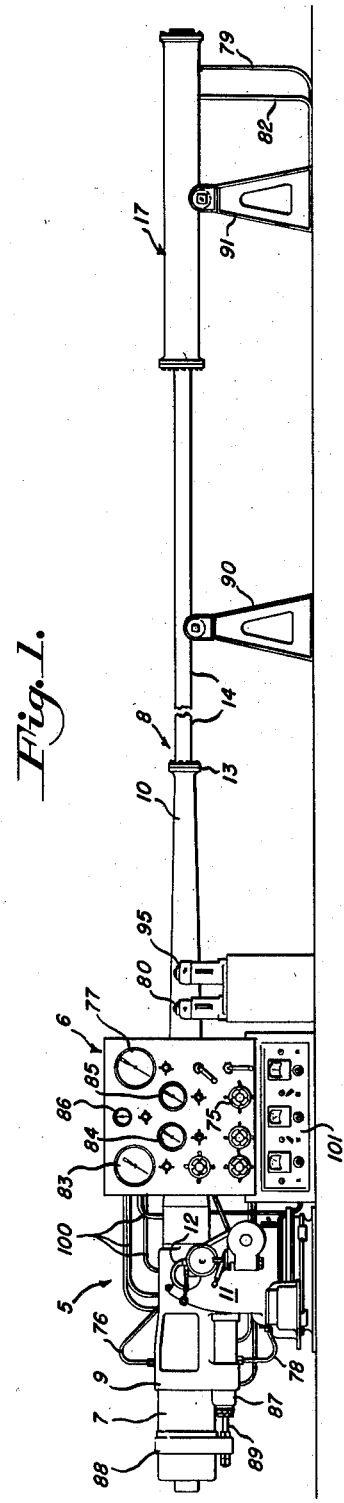
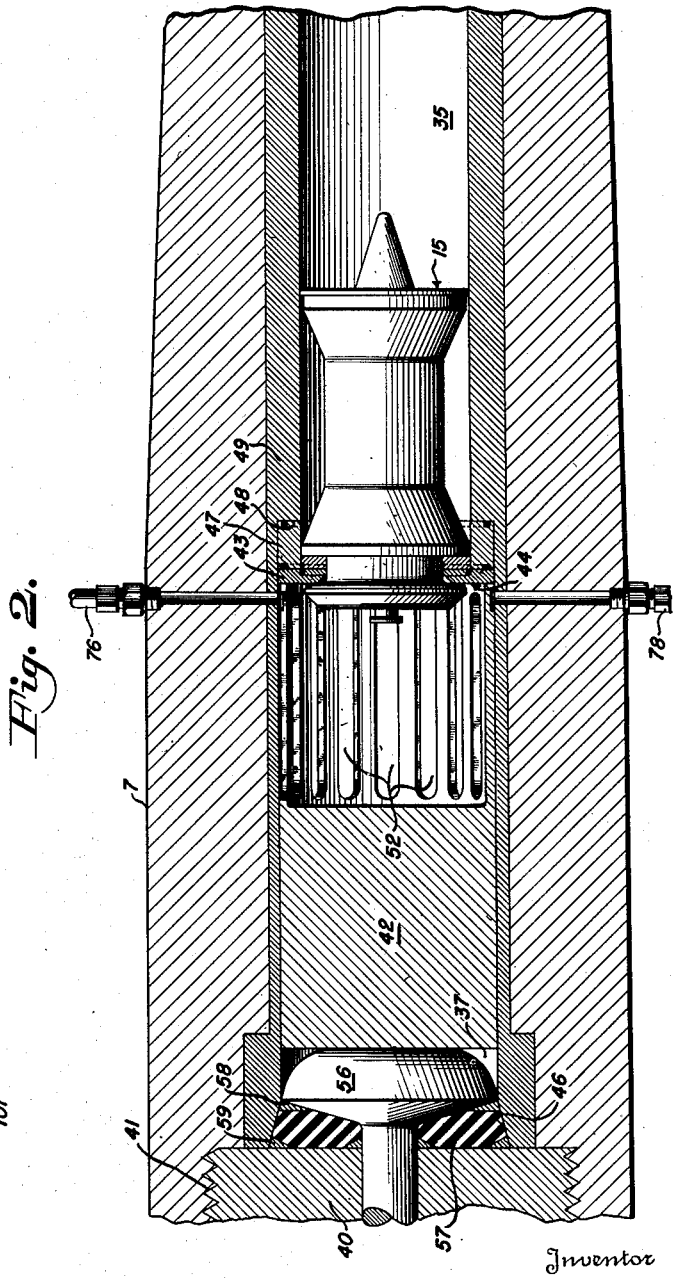
Inventor
C. A. Shreeve, Jr.
J. Fishkin
J. H. Armstrong
By M. C. Hayes
Attorney

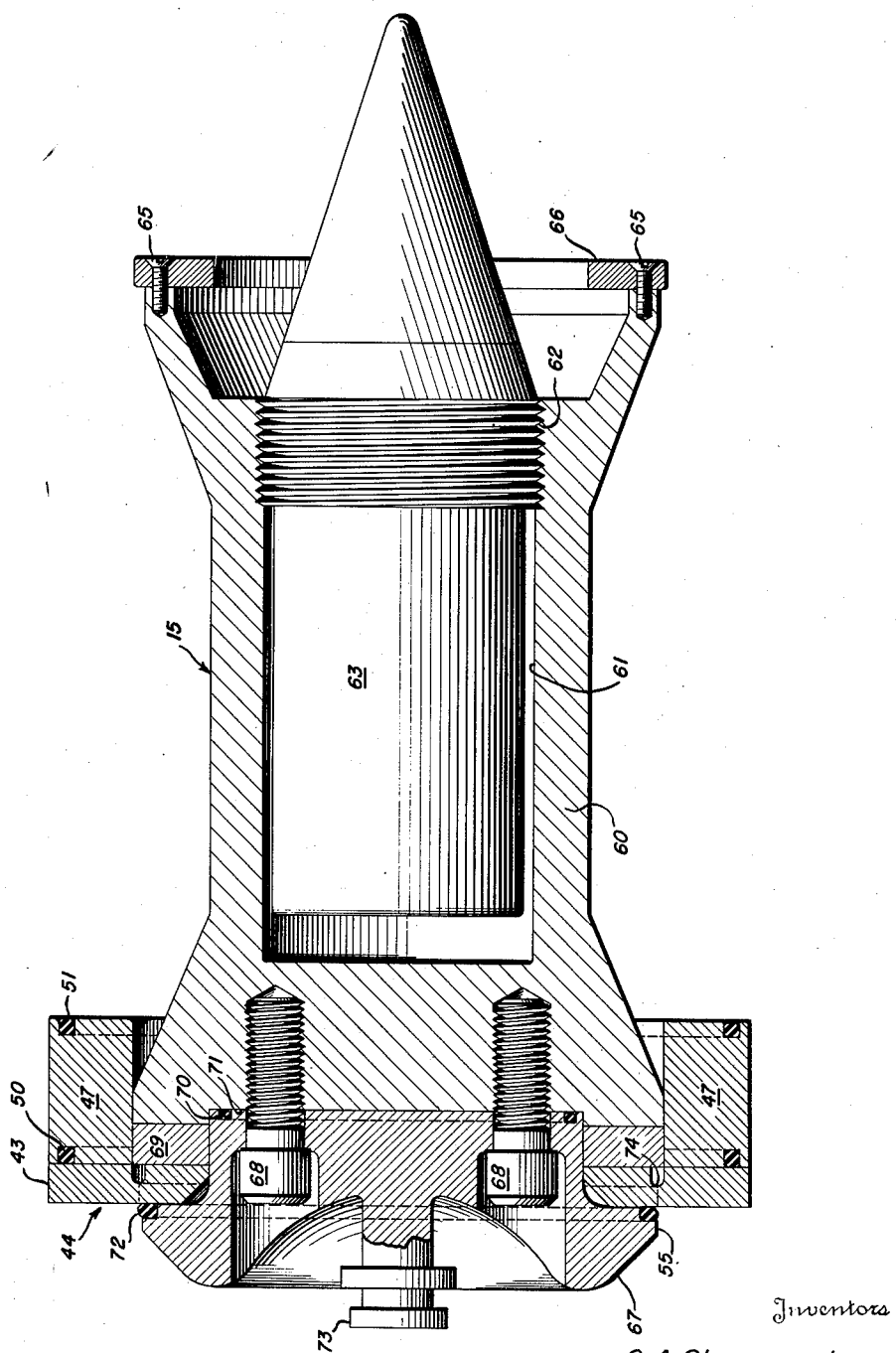

Jan. 9, 1951     C. A. SHREEVE, JR., ET AL     2,537,096
HIGH ACCELERATION SHOCK TESTING AIR GUN

Filed Feb. 4, 1949     3 Sheets-Sheet 3

Inventor
C. A. Shreeve, Jr
J. Fishkin
J. H. Armstrong
By
Attorney

Patented Jan. 9, 1951

2,537,096

UNITED STATES PATENT OFFICE 2,537,096

HIGH ACCELERATION SHOCK TESTING AIR GUN

Charles A. Shreeve, Jr., College Park, Md., John H. Armstrong, Washington, D. C., and Joseph Fishkin, Perth Amboy, N. J.

Application February 4, 1949, Serial No. 74,642

10 Claims. (Cl. 73—167)

(Granted under the act of March 3, 1883, as amended April 30, 1928; 370 O. G. 757)

This invention relates generally to test apparatus and more particularly to a device of this character adapted to accelerate and decelerate, under controlled hydraulic pressures, the object under test for the purpose of determining the effect of shock thereon.

Heretofore, considerable difficulty has been encountered in the testing of certain types of naval ordnance particularly those intended for use under conditions of high acceleration shock such, for example, as projectile fuzes, torpedo controls and high altitude aircraft launched mines, or the like. Frequently field testing of such apparatus results in either the loss of the equipment or such damage thereto as to render it valueless as a source of information.

For several years the Government has been interested in the development of equipment and the perfection of techniques whereby as many of these tests may be conducted in the laboratory rather than in the field. Service evaluation wherein the completed weapons are subjected to performance tests duplicating the conditions of actual use must, of course, be the final step in development, but in the preliminary stages the advantages of controlled laboratory shock simulation has proven invaluable.

It has been frequently demonstrated both experimentally and analytically that laboratory apparatus for duplicating field shock conditions does not necessarily have to simulate exactly the extreme shock parameters of each particular case, for example, short impulsive velocity changes are known to produce the same response in a system of relatively low natural frequency as that resulting thereto from lower acceleration, longer duration pulses of equal total energy. By providing a test instrument, as in the case of the present invention, wherein the acceleration of the object under test may be accurately controlled for producing the exact shock curve desired, lends to a far wider range of laboratory shock application than permissible with instruments of the type heretofore devised.

According to the shock testing apparatus of the present invention, a test device in the form of an air gun is provided wherein a piston carrying the part to be tested initially is restrained from movement within the barrel of the gun by means of a frangible diaphragm until the pressure of a volume of air behind the piston and diaphragm has been increased to a predetermined value whereupon the diaphragm is ruptured and the piston is accelerated down the barrel by the pressure of the released air thereon to thereafter be brought to a gradual stop by compression of the air in the barrel ahead of the piston. By increasing or reducing the air density in the air volume before the piston, the travel of the piston may be increased or reduced, as the case may be, to cause the shock pattern produced thereby to conform to that desired. A pressure relief chamber and valve in the connection therewith provides a reservoir for storing a portion of the kinetic energy in the air ahead of the piston to thereby substantially reduce oscillation of the piston at the end of the piston stroke.

It is an object of the present invention to provide a shock testing device adapted to accelerate and decelerate an object under test to determine the effect of shock thereon.

Another object of the present invention is to provide new and improved shock testing apparatus which may be operated under controlled conditions to accelerate an object to be tested in a manner to impart shock effects thereto simulating the shock effects received by the objects under actual conditions of service.

A further object is to provide new and improved apparatus for subjecting ordnance devices to shock effects which simulate the effects of shock received thereby under conditions of transport and service.

A still further object is to provide a shock testing device of this character adapted for testing a wide variety of ordnance devices by applying thereto a wide range of shock parameters encountered in the service use of such devices.

An additional object is to provide a shock testing device of an air gun type wherein a piston carrying the part to be tested is accelerated within the barrel of the gun by air pressure applied thereto and decelerated by air compressed in the barrel by movement of the piston therein.

Other objects and many of the attendant advantages of this invention will be readily appreciated as the same becomes better understood by reference to the following detailed description when considered in connection with the accompanying drawings wherein:

Fig. 1 is a side view in elevation of the air gun according to the preferred form of the invention;

Fig. 2 is a somewhat enlarged fragmentary sectional view taken through the breech assembly of the air gun and showing the arrangement of the piston or projectile in the barrel thereof prior to acceleration;

Fig. 3 is a somewhat enlarged detailed sectional view of the projectile with the fuze under test mounted therein.

Figure 4:
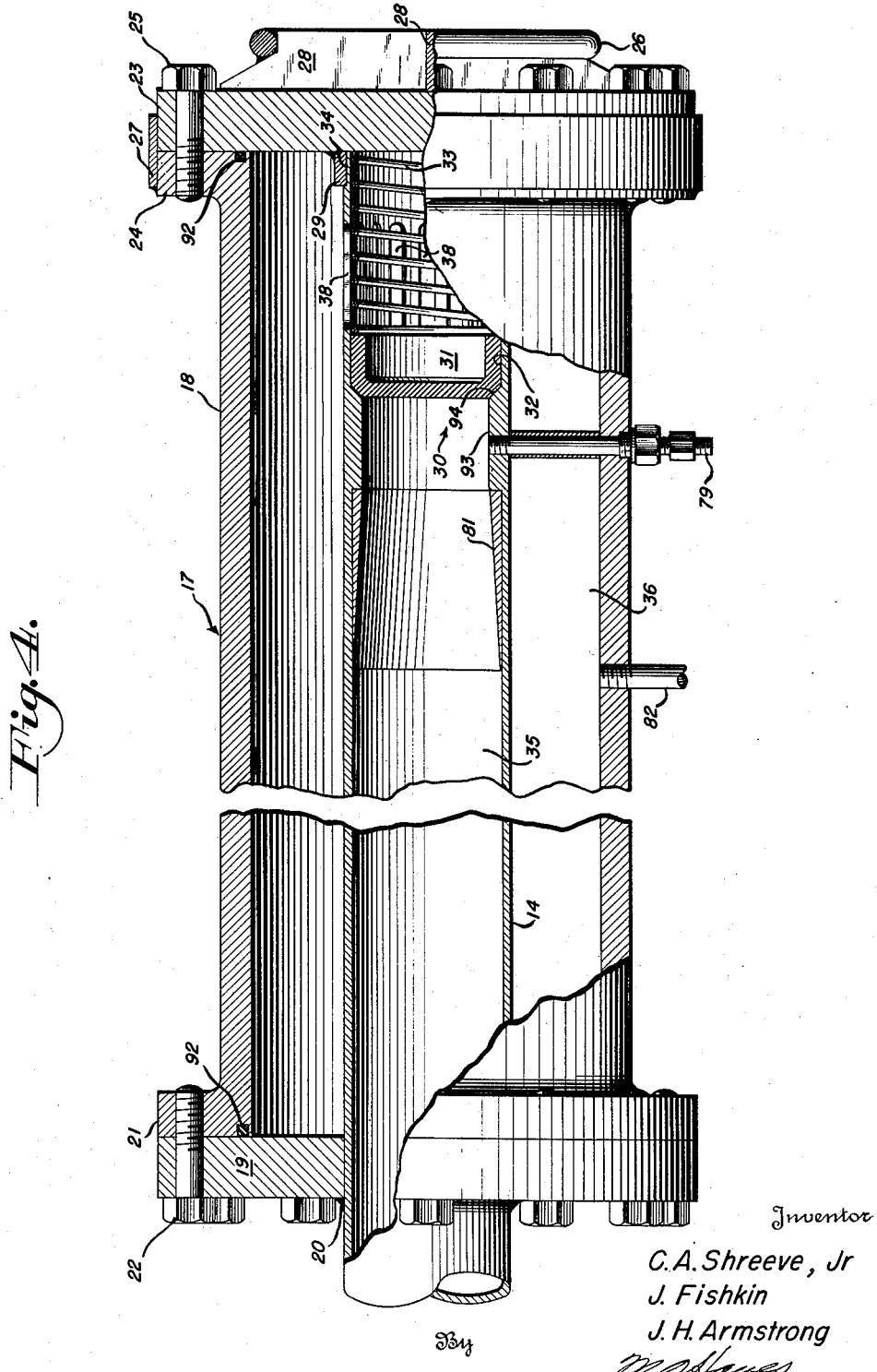
Fig. 4 is a somewhat enlarged view partly in elevation and partly broken away of the muzzle tank or pressure relief chamber on the muzzle end of the barrel and the valve arrangement therebetween.

Referring now to the drawings and more particularly to Fig. 1 thereof, the test gun generally designated 5 is shown in operative association with respect to the control panel 6 therefor whereupon is arranged a plurality of valves and gauges adapted to control and indicate, respectively, the various pneumatic pressures throughout the gun, as will become more apparent as the description proceeds.

The high pressure portion 7 of the gun barrel generally designated 8, is shown as supported within a collar 9 adapted to be secured, as by trunnion clamps 12, to a carriage 11 that may be of any suitable design such, for example, as that known as a Naval 5 inch gun mount Mk 15–1.

Secured to the high pressure section 10 of the barrel as by a bolted flange connection 13 is an extension 14 preferably formed from a seamless tubing having an internal diameter conforming exactly to the diameter of the bore of the high pressure barrel section 7 and preferably ground and polished integrally therewith. The extension to be of a length satisfactory to permit sufficient travel of piston 15, Fig. 2, carrying the part to be tested to apply to the part the shock condition desired.

Arranged over the muzzle end of the extension is a pressure tank generally designated 17 and comprised of an outer casing 18, Fig. 4, one end of which is closed by an annular disk 19 secured as by welding at 20 to the outer surface of the extension and thereafter secured to a flange portion 21 of the casing as by bolts 22. The other end of the tank is shown as closed by a cap piece 23 fastened to flange 24 of the casing as by bolts 25. Cap piece 23 preferably has welded thereto a central flange 29 for telescopically receiving and supporting the end of extension 14 as at 34. A number of ribs 28 arranged radially or spider-like about the outer surface of this cap and secured thereto as by welding adds rigidity to the cap as well as provides a mounting surface for a handle ring 26 welded to the outer edge of the ribs and by which the cap may be lifted for mounting or removal from the tank opening. A band or hoop 27 welded to the periphery of flange 24 supports the cap while attaching bolts 25 are arranged therethrough. Ring gaskets preferably are employed as at 92 to make the pressure tank airtight.

Closing the end of the extension 14 is a check valve assembly generally designated 30 including a cup-shaped valve plug or member 31 slidably arranged within a counterbore 32 and adapted to be urged yieldably into barrel closing position by pressure thereagainst of a helical spring member 33 arranged between the rear of the plug and the cover plate 23. Bore 32 is reduced at 93 thereby to form a seat for the valve member 31 at 94.

The valve member 31 is adapted to yield before the increasing air pressure within volume 35, as the piston is driven thereagainst by the force of the greater air pressure within volume 37, to allow a portion of the compressed air before the piston to flow through elongated ports 38 or louvers into the tank volume 36 to be trapped therein by the closing of the valve as the pressure on opposite sides of valve member reaches a near state of equilibrium.

By referring to Fig. 2 of the drawings, the breech end of the high pressure barrel 7 may be seen as closed by a threaded block member 40 that is provided with the usual pressure sealing elements, namely, a movable mushroom head 56 and gas check pad 57 having arranged therein steel sealing rings 58 and 59 adapted to expand outwardly with the pad into sealing engagement with the tapered surface 46 of the barrel liner 49 as the mushroom head is pressed thereagainst by air pressure within chamber or volume 37. Block 49 is adapted as it is rotated into breech closing position within the threaded section 41 of the barrel to force inwardly within the high pressure chamber 37, a spacer or volume controlled block 42 adapted, as it moves into the chamber, to press forward upon the extending flange 43 of a frangible disc or diaphragm member generally designated 44, Fig. 3, to grip the diaphragm between the forward end of the spacer and a sealing ring member 47 that bears against shoulder 48 of barrel liner 49. A pair of O ring gaskets 50 and 51 conventionally arranged within suitable annular grooves provided therefor in the sealing ring member 47 prevent escape of air by the sides of the ring from the high pressure chamber 37 into the barrel volume or chamber 35.

By reason of the fact that the velocity of the projectile is controlled to some extent by the flow of air from chamber 37 as it expands behind the piston, the volume control block 42 is provided with longitudinal slots or louvers 52 arranged through the wall section provided in the hollowed forward portion thereof, through which louvers air pressure may be rapidly communicated to the base or back face of the piston from all the air filled spaces within chamber 37 as the piston is accelerated after rupture of the retaining diaphragm 44 therefor.

The solid section or rear end portion of the spacer block 42 serves to reduce the air volume of chamber 37 thereby altering the resultant acceleration curve produced by the piston in proportion to the volume of propelling air under pressure. For producing varying shock conditions, blocks of varying displacement values may be used in substitution selectively for the block 42.

The piston body 60, as best illustrated in Fig. 4, is generally of spool-shaped configuration and is provided with a bore 61 threaded at 62 for receiving therein a projectile fuze 63 to be tested. It will be understood, however, that various other size fuzes or similar small mechanisms may be secured to the piston for test by using suitable adapters equipped for threadedly connecting with the piston in the manner illustrated. Secured to the piston body on the forward end face thereof as by screws 65 is a bearing ring 66 formed from bronze or brass, or the like, and operative to reduce the surface friction of the projectile as it is accelerated down the bore.

The piston retaining diaphragm 44 is clamped to the base or rear end face of the piston as by a flanged cap piece 67 drawn against the diaphragm by the tightening of bolts 68 threadedly connecting with the piston body. A spacer or washer 69 is arranged between the diaphragm and the piston body and is provided with a thickness selected in accordance with the thickness of the particular diaphragm used whereby, as cap 67 is drawn tight upon the diaphragm by bolts 68, the sealing O ring 70 carried by the cap is forced into sealing engagement with the undercut surface 71 of the piston body with which cap 67 is adapted to make registering engagement therewith, thereby preventing pressure from leaking by the cap from around the bolts 68 therethrough. A second O ring 72 arranged within a suitable groove provided therefor about the inner surface of the cap flange 55 prevents the escape of pressure between the cap and diaphragm. The piston assembly is adapted for being lifted into the barrel by the provision thereon of a flanged lug portion 73 extending rearward centrally from the cap piece and suitable for connecting with an elongated staff not shown, whereupon is provided a socket for gripping the flange of the lug.

Before operating the device, a diaphragm 44 suitable for the test is selected and may be formed from brass, aluminum or plastic, as the case may be. The diaphragm must have the requirement for rupturing at the pressure necessary to produce the acceleration curve desired. To provide a diaphragm of slightly varying characteristics without substituting materials or altering the basic dimensions thereof, a groove varying in depth accordingly is machined in the face of the diaphragm at 74, thereby providing therein a weakened section whereupon the diaphragm will break clean at the time pressure is applied thereto of a predetermined value.

After the diaphragm has been secured to the piston and the part to be tested suitably mounted thereon, the piston is lifted into the barrel and clamped thereto in the manner heretofore described by the closing of the breech block 40. The valve 75 on the control panel 6 is then opened to permit air from compressors, not shown, to flow into the high pressure chamber 37 through the connection 76 to increase the pressure therein to a value indicated upon the dial of gauge 77 connected to chamber 37 through the conduit 78.

As the pressure is increased within the chamber to the yielding point of the diaphragm, the piston carrying the part under test is discharged down the barrel to attain peak acceleration almost instantaneously with the piston gradually moving to a stop as the air within volume 35 is compressed before it. The valve 30, operating in the manner heretofore described, opens as the pressure against it increases to trap within tank 17 a large percentage of the air and resulting energy therefrom, thereby greatly reducing oscillation of the piston while the air pressure within the volumes or chambers 37 and 35 before and after the piston reaches a state of equilibrium. To provide certain conditions of test particularly where extreme high velocities are desired, air under pressure must be introduced through the connections 79 and 82 into the chambers 35 and 36 to apply an initial pressure to these volumes to thereby reduce the travel of the piston to conform to the length of the barrel extension employed.

A choke ring 81 arranged in the muzzle as indicated in Fig. 4 serves as a safety device to bind and stop further travel of the piston should the air before the piston not compress sufficiently to stop the piston as may be caused by a loose connection about the cap 23 or by escapement of air by the piston surfaces. As the piston is accelerated, the recoil of the barrel is compensated by recoil cylinder 87 connected to the breach ring 88 as by rod 89, the barrel and extension assembly moving back upon the roller equipped supports 90 and 91 thereof.

Arranged in spaced relation along the barrel 8 is a pair of drilled holes therein, not shown, through which light beams are directed to strike upon the element of a pair of photoelectric cells arranged in containers 89 and 95 respectively. As the projectile moves through the barrel to successively interrupt these light beams, a recording is made on a chronograph or like instrument whereupon the exact velocity of the projectile may be determined.

Upon completion of the test and when the piston has come to rest within the barrel, the pressure within volume 37 is exhausted through the connection 78 to allow the piston to be gradually forced backward in the direction of the breech by the now greater pressure before the piston within volume 35. If additional pressure is required within this volume to force the piston to the breech end of the gun, it may be supplied thereto from the trapped gas within the tank 17 by means of a suitable by-pass connection from port 82 to 79 or by air from the compressors. The gauges 83, 84, 85, and 86 on the panel are connected respectively to the aforementioned conduits 76, 78, 79, and 82 for indicating at all times the pressures within the various portions of the gun connected thereto.

To provide means for determining the acceleration of the piston after rupture of the retaining diaphragm therefor, suitable fluid connections 100 may be made with the volume 35 at selected intervals along the barrel in the path of the moving piston and adapted as the piston is accelerated thereby to communicate pressure signals to suitable recording apparatus 101 that may be mounted beneath the control panel 6.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A device for shock testing an object comprising, in combination, an elongated barrel, closures for each end of said barrel, a frangible diaphragm secured to the inner wall of said barrel for dividing the barrel into two sealed compartments, a piston adapted to carry the object to be tested and held by said diaphragm in restrained position in the barrel, means for admitting air under pressure into one of said compartments to increase the pressure therein to a value equal to the fracture point of said diaphragm thereby releasing the piston for accelerated movement into the other of said compartments to increase the pressure therein to a value equal to the pressure behind the piston.

2. A shock inducing device of the character disclosed for applying acceleration shock to apparatus under test including, in combination, an elongated barrel, means for closing the ends of said barrel, a piston adapted for carrying the apparatus to be tested and arranged in said barrel in predetermined spaced relation with respect to one end thereof, a diaphragm secured to said piston and to said barrel in pressure sealing relation therewith thereby to form in the barrel two air volumes, means for admitting air under pressure into one of the said volumes for increasing the pressure therein to a value equal to the fracture point of said diaphragm thereby releasing the piston for accelerated movement into the second volume to be decelerated therein by the compression of the air within the said second volume.

3. A device of the character disclosed adapted to apply acceleration shock to apparatus under test and including in combination, a mount, a barrel having a muzzle and breech end thereon arranged on said mount, a block for closing the breech end of said barrel, a closely fitting piston adapted for carrying the apparatus to be tested and arranged for sliding movement in said barrel, means including a frangible diaphragm for securing in sealing relation therewith the piston to said barrel in predetermined adjacency to said block to form in the breech end of the barrel a pressure chamber of a predetermined volume, means for admitting air under pressure into said pressure chamber for increasing the pressure therein to the fracture point of said diaphragm thereby releasing said piston for accelerated movement through the barrel in the direction of said muzzle, a valve seat provided in said muzzle, a valve plug, resilient means for yieldably urging said valve plug in barrel closing position in said seat, exhaust ports for said valve, a pressure relieving tank arranged over the muzzle end of said barrel and in fluid communication with said valve ports, said valve being adapted in response to the increase of air pressure in the muzzle portion of barrel caused by the approach of the accelerated piston thereagainst to move said valve from said seat to thereby communicate a portion of the pressure in said muzzle to said tank, said valve being constructed to cut off air communication to the tank when the piston reaches the end of said movement.

4. A shock testing device of the character disclosed adapted to apply acceleration shock to apparatus under test and including a mount, a barrel assembly yieldably supported on said mount, said barrel including a breech chamber, a breech block for closing the end of the barrel adjacent the breech chamber, a frangible diaphragm, means including a cylindrical spacer plug for clamping said diaphragm to the barrel upon closure of the barrel by the block, means for admitting air under pressure into the breech chamber for increasing the pressure therein to a value exceeding the strength of said diaphragm, a piston adapted to receive the apparatus to be tested and clamped to said diaphragm, said piston being operative upon rupture of the diaphragm to accelerate in the barrel in response to the expanding air from the breech chamber, a check valve yieldably arranged in the end of said barrel opposite from said breech, and an exhaust port provided for said valve, said valve being adapted to open and exhaust through said port a portion of the air compressed by the approach of the piston thereagainst.

5. A device for shock testing an object comprising, in combination, an elongated barrel, a piston slideably supported within said barrel and constructed and arranged to support said object slideably therein, means including a frangible diaphragm arranged within one end of the barrel in pressure sealing and securing relation with respect to the piston so as to form therewith a pressure chamber in said one end of the barrel, means for admitting air under pressure into said pressure chamber, said diaphragm being so constructed as to be ruptured when the pressure of the air in the chamber reaches a predetermined value thereby to release the piston for accelerated movement toward the other end of the barrel by the pressure of the air thereon, means forming a pressure relieving chamber arranged at the other end of the barrel in air communication therewith, and valve means arranged in said other end of the barrel for controlling the flow of air from the barrel to said pressure relieving chamber, said valve means being constructed and arranged to cut off air communications between the barrel and said chamber when the piston reaches the end of said movement.

6. A device for shock testing an object comprising, in combination, an elongated barrel closed at both ends, and object supporting piston slidably mounted within said barrel and initially positioned in spaced relation with respect to one end thereof, means including a frangible diaphragm for releasably locking the piston in said initial position and in pressure sealing relation with respect to the barrel thereby to form a pressure chamber between the piston and said one end of the barrel, means for receiving air under pressure into said pressure chamber, said diaphragm being so constructed as to be ruptured when the air pressure in said chamber reaches a predetermined value thereby to release the piston for accelerated movement toward the other end of the barrel, and means including a pressure relieving chamber at said other end of the barrel for absorbing the kinetic energy stored in the compressed air in front of the accelerated piston thereby substantially to reduce oscillation thereof at the end of the piston stroke.

7. A device for shock testing objects comprising, in combination, a mount, an elongated barrel yieldably arranged on said mount, means including a removable member for closing one end of said barrel, a closely fitted piston arranged in said barrel in predetermined space relation to said closed end thereof, said piston being constructed and arranged to support thereon the object under test, a frangible diaphragm secured to the piston for releasably locking said piston in pressure sealing relation within said barrel thereby to form therein a pressure chamber between the piston and the closure therefor, a source of compressed air, means for admitting air under pressure from said source to said chamber, said diaphragm being so constructed as to be ruptured when the air pressure in said chamber reaches a predetermined value thereby to release the piston for accelerated movement toward the other end of the barrel, a normally closed pressure responsive valve arranged at the other end of said barrel, a pressure tank disposed about said barrel and in fluid communication with said valve and adapted to receive therethrough air compressed in the barrel by the accelerated piston, said valve being adapted to be opened by the pressure differential thereagainst and to be closed and cut off air communication between said barrel and tank when the piston reaches the end of said movement.

8. A device for shock testing an object including an elongated barrel, means including a check valve for closing one end of said barrel, a breech block for closing the other end of said barrel, a mushroom head movably mounted on said block, a gas check pad arranged for compression into sealing engagement with the barrel as pressure is applied to said head, means forming a shoulder in the barrel in spaced adjacency to said block, means forming a sealing ring in abutment with said shoulder, a grooved annular flange member, a spacer member interposed between said flange member and said breech block and adapted to compress the flange into pressure sealing engagement with the sealing ring upon closing of said barrel by said block, a piston adapted for carrying the object under test constructed and arranged for clamping within said annular flange in peripheral alignment with said groove therein and adapted to cooperate with said flange to divide said barrel into a high pressure chamber and a low pressure chamber, means including a conduit for admitting air under pressure into said high pressure chamber to increase the pressure therein to a value sufficient to shear said flange at said groove thereby to release said piston for accelerated movement in the direction of said valve to compress the air in said low pressure chamber to a value sufficient to operate said valve to open position, a pressure tank in fluid circuit with said valve and adapted upon opening of the valve to receive air under pressure from said low pressure chamber, said valve being adapted to operate to barrel closing position at the end of said movement of the piston for reducing oscillatory motion of the piston.

9. A device for applying acceleration shock to apparatus under test including in combination, a mount, an elongated barrel movably disposed on said mount, means for closing one end of said barrel including a threaded block member, a normally closed pressure responsive valve disposed within said barrel and adapted to close the other end of said barrel, means forming a pressure seal between the barrel and block including a mushroom head movably disposed within said block, a gas check pad arranged between a portion of said head and said block and adapted as pressure is applied to the head to compress into sealing adjacency with said barrel, means forming a shoulder in said barrel in spaced adjacency from said block, an annular frangible diaphragm, means cooperating with said block for clamping said diaphragm to said shoulder in pressure sealing relation thereto, a piston adapted for carrying the apparatus to be tested secured within said diaphragm and cooperating therewith to form in said barrel a pressure chamber, means for admitting air under pressure to said chamber, said diaphragm being so constructed as to rupture when pressure of the air in the chamber reaches a predetermined value thereby to release the piston for accelerated movement with said apparatus carried thereon toward the valve closed end of said barrel in response to pressure of air thereon, a pressure relieving tank arranged over said barrel and in air communication with said valve, said valve being adapted to open by the air compressed by the accelerated piston thereby to vent said air to said tank, said valve being adapted to close the barrel as the piston reaches the end of said movement thereby to reduce oscillatory motion of the piston at the end of the piston stroke.

10. A device for shock testing an object comprising, in combination, an elongated barrel member, closures for sealing the ends of said barrel member, a piston adapted for carrying the object under test arranged in said barrel for sliding movement therein, means including a frangible diaphragm secured in pressure sealing relation with said piston and to said barrel in closely spaced adjacency to one end thereof forming within the barrel on opposite ends of said piston and diaphragm a first pressure chamber disposed between the piston and diaphragm and said one end of the barrel and a second pressure chamber respectively, means for admitting air under pressure to said first pressure chamber to increase the pressure therein to a value sufficient to rupture said diaphragm thereby to release said piston for accelerated movement in the direction of said second pressure chamber, said piston being adapted by said movement to compress the air in the second pressure chamber to a value sufficient to arrest the movement of the piston as the piston approaches the other end of the barrel.

CHARLES A. SHREEVE, Jr.
JOHN H. ARMSTRONG.
JOSEPH FISHKIN.

REFERENCES CITED

The following references are of record in the file of this patent:

UNITED STATES PATENTS

| Number | Name | Date |
|---|---|---|
| 279,538 | Chamberlain | June 19, 1883 |
| 556,058 | Huey | Mar. 10, 1896 |
| 2,356,992 | Gilson | Aug. 29, 1944 |